June 19, 1945.  W. R. ANDERSON  2,378,678
PORTABLE STEP FOR VEHICLE REPAIR MECHANICS
Filed July 23, 1943  2 Sheets-Sheet 1

INVENTOR.
WILLIAM R. ANDERSON
BY
J. H. Weatherford
Atty.

June 19, 1945.  W. R. ANDERSON  2,378,678
PORTABLE STEP FOR VEHICLE REPAIR MECHANICS
Filed July 23, 1943  2 Sheets-Sheet 2
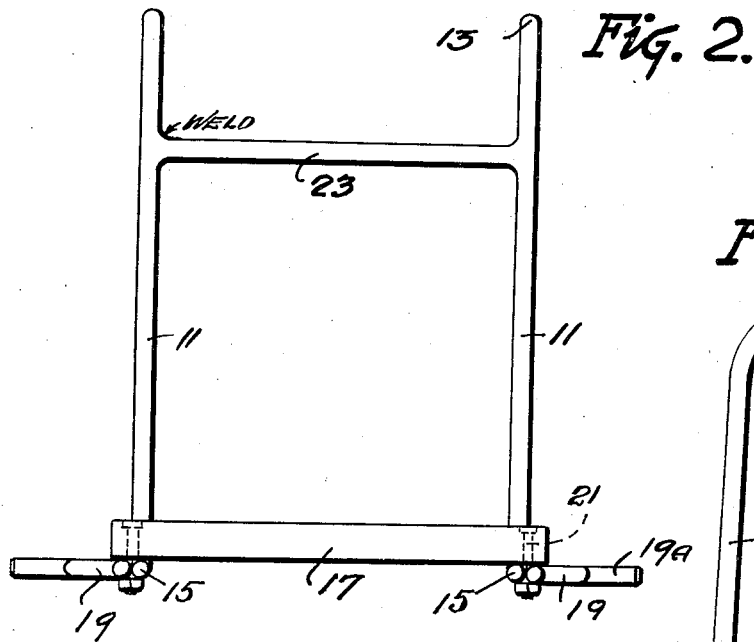
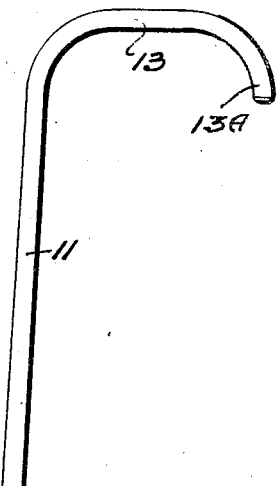
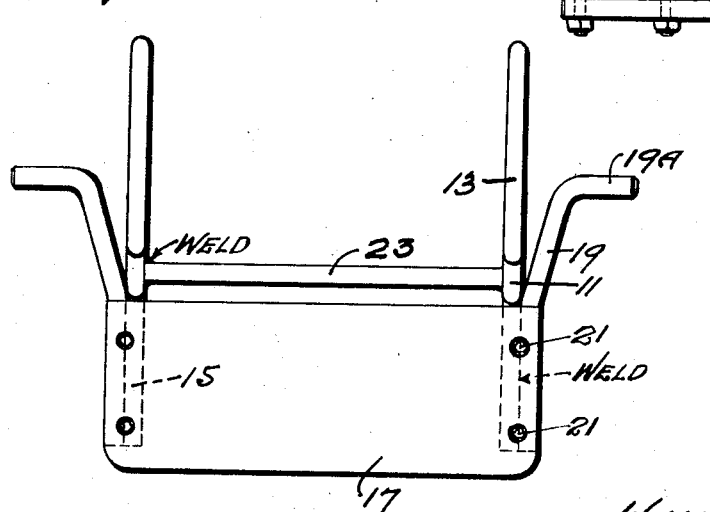
INVENTOR.
WILLIAM R. ANDERSON
BY J. H. Weatherford
Atty.

Patented June 19, 1945

2,378,678

UNITED STATES PATENT OFFICE 2,378,678

PORTABLE STEP FOR VEHICLE REPAIR MECHANICS

William R. Anderson, Memphis, Tenn., assignor of one-third to James Madison Foster and one-third to Edward N. Tracy, both of Memphis, Tenn.

Application July 23, 1943, Serial No. 495,840

1 Claim. (Cl. 228—51)

This invention relates to improvements in steps or supports adapted to be detachably engaged with the wheel of an automobile or truck for support thereby, and when so supported to form a step on which a mechanic can stand and reach over the fender of the car or truck to do such work as may be necessary or desired on the engine or other parts of the vehicle.

In automobile repair it is usually not difficult for a workman to stand on the ground, bend over the fender and reach in under the hood from one side or the other to accomplish work which may be necessary, but even here some support must at times be provided which will enable such access to be had.

Trucks, tractors and other of the larger and more powerful motor vehicles present, however, a much more difficult problem, in that it is practically never possible for a workman to reach many of the parts under the hood that he must work on without providing some form of support which will raise him from the ground and enable him to carry on his work.

It is presently customary to move a box, bench, or some other support alongside the wheel and stand on this in order to accomplish the desired access. These supports are often used for other things and are not available when they are needed, or if available must be hunted up and hauled to position, and after positioning are liable to overturn under the outward thrust of the workman's feet when he reaches far in under the vehicle hood, or even to be knocked out from under his feet by careless handling of equipment moving past.

Vehicle wheels are obviously of various diameters and carry tires of various sizes, but the majority of truck wheels do not greatly vary in diameter and the tires of the great majority vary between six and ten inches in diameter, so that it is possible to make a step or support which can be used therewith and obviously where special conditions arise, special forms or sizes of the device may be made therefor.

The objects of the present invention are:

To provide a support or step which may be detachably secured to, and supported by, the wheel of a vehicle and which when attached is resistant to accidental dislodgment and can be relied on to solidly and safely support a workman in carrying out his work.

A further object is to provide a step support which may be interchangeably secured to the wheels on both sides of the vehicle.

A still further object is to provide a support which is usable with wheels of different hub design, and diameter and size of tires.

The means by which these and other objects are accomplished, and the method of their accomplishment will readily be understood from the following specification upon reference to the accompanying drawings, in which:

Fig. 2 is a front elevation of the device.

Fig. 3 is a corresponding side elevation; and

Figure 1:
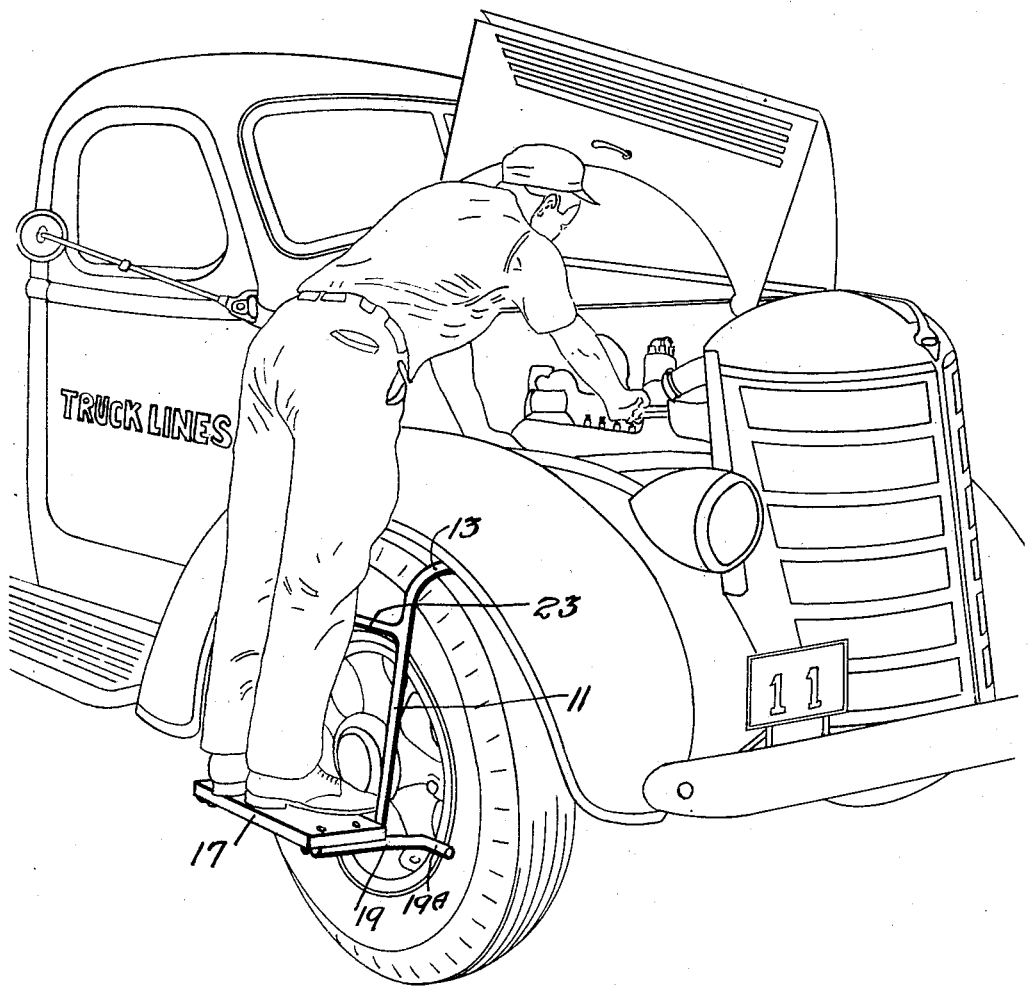
Fig. 1 is a perspective view of the front end of a vehicle truck or tractor showing the step attached to and supported by the wheel and a workman standing on the step and at work under the hood.

Fig. 4 a plan view.

Referring now to the drawings in which the various parts are indicated by numerals:

The device comprises a pair of brackets, each preferably a metal member which may be a solid bar or a pipe, the bar having an upright portion 11 which at its upper end is inwardly curved to form a shallow hook 13 adapted to overlie the top of the tire of the wheel, the hook terminating in a downwardly extending portion 13—A which engages behind the tire and resists any tendency to dislodge it. The downwardly extending portion 13—A is spaced from the upright portion 11 sufficiently to accommodate the largest size tire with which the device is to be used. At its bottom end the upright portion is bent outwardly in a generally horizontal direction to form a support 15 for a step 17. This outwardly extending portion may then be bent backward along itself to form a strut 19 which extends inwardly behind the upright portion and toward the tire of the wheel, the strut preferably being flared laterally outward and terminating in a further lateral extension 19—A which permits use with a greater range of wheel diameter, and assures bearing against the tire itself, rather than with the wheel rim or other portion of the hub. Usually it is found more convenient to make the strut 19 as a separate piece rather than by bending the support 15 backward, this separate piece being likewise a metal member and being secured rigidly to the step support 15 as by welding, and even though the strut be a reversely bent portion of the support 15, it likewise is preferably welded to the support.

The step 17 is of a length to span between the two brackets and to fully overlie the support and strut members. It may extend additionally, but any considerable extension is found undesirable in that there is a tendency toward overturning should the workman inadvertently stand thereon. The step is secured at its opposite ends very rigidly to the underlying supports 15, preferably by bolts 21, suitable holes being made for the bolts along the line between the support and the strut, if they be welded together. Two bolts spaced apart are preferably used in order that the step may definitely assist in establishing rigidity of the structure.

Adjacent the upper end of the upright portions 11 of the two brackets a cross member or brace 23 extends from upright to upright and is secured to both thereof as by welding, the intention of the whole structure being to construct a device which has extreme rigidity of all its parts.

It will be obvious that a wooden member might be substituted for the metal cross member and this wooden member be secured, as is the step 17, but such construction is not preferred.

It will be particularly noted that the construction as delineated above leaves both the front and rear edges of the step 17 entirely unobstructed and that the struts hold the step away from the wheel and clear of any usual wheel hub so that the workman's foot may readily extend beyond the inner edge of the step and a firm footing be secured irrespective of the size of the mechanic's foot, and be also prevented by the uprights 11 from slipping sidewise off the end of the step.

It will be further noted that as the size of tire increases the tilt of the uprights from vertical is increased and the outer edge of the step is raised above horizontal, automatically effecting a compensating positioning as the step is moved further away from the work.

In use the device may be shifted from side to side of the vehicle, being obviously equally usable on either side, but ordinarily it is preferred that two of the devices be employed in order that the mechanic may change his working position from one side to the other from time to time as occasion demands without having to shift his step support. Ordinarily the hook portion of the device is slipped under the vehicle fender and over the top of the tire and dropped into place. However, in many instances the fender so closely embraces the top of the wheel that this is not possible. In such cases the device is so turned that the step portion is in a generally vertical position, the hooks are engaged over the front of the tire below the fender and the device shifted around into the supporting position shown in Fig. 1. Incidentally where such a condition exists, added safety is provided in that it is impossible to accidentally dislodge the supporting hooks.

It will be understood that modification in detail may be made without departing from the spirit of my invention and that the present embodiment thereof is to be considered as illustrative and not restrictive, the scope of the invention being indicated by the appended claims rather than the foregoing description, and all changes which come within the meaning and range of equivalency of the claim are therefore to be embraced thereby.

I claim:

A portable step for vehicle repair mechanics, adapted for support by a pneumatic tired vehicle wheel, said step comprising a pair of brackets, a brace, a step member, and struts; each said bracket comprising an upright member curved inwardly at its upper end to form a hook portion adapted to engage and be supported by said tire and terminating in a downwardly extending portion resisting hook disengagement, and at its lower end extending substantially horizontally outward to form a step member support, said bracket members being spaced apart for engagement with the arcuate top portion of said tire; said struts each respectively being rigidly secured to said step support, and extending wheelwardly beyond the upright portion of said brackets and each respectively terminating in a laterally flared portion adapted to overlie and rest against the outer side of the tire of said wheel; said brace extending between said upright portions adjacent the upper ends thereof and being rigidly secured to both thereof; and said step member being seated on said supports and rigidly secured to both thereof.

WILLIAM R. ANDERSON.